Figure 1:
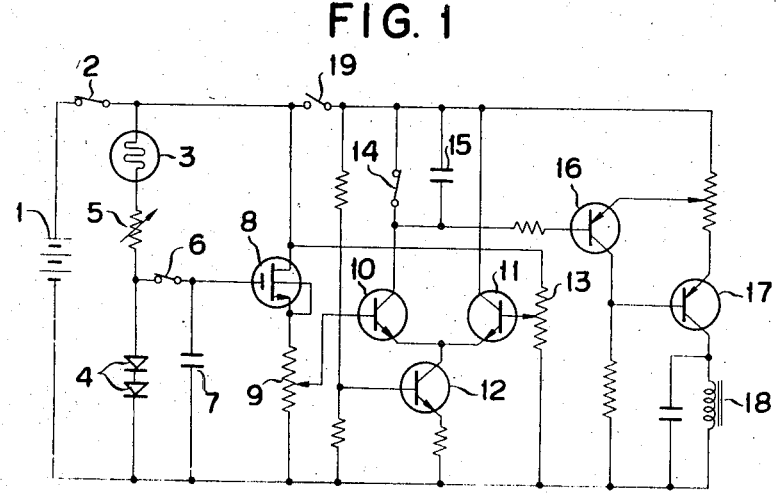

United States Patent

Ono

[15] 3,641,890
[45] Feb. 15, 1972

[54] EXPOSURE-MEASURING DEVICE FOR CAMERAS PROVIDED WITH ELECTRONIC SHUTTER

[72] Inventor: Shigeo Ono, Yokohama-shi, Japan
[73] Assignee: Nippon Kogaku K.K., Tokyo, Japan
[22] Filed: Oct. 28, 1968
[21] Appl. No.: 771,002

[30] Foreign Application Priority Data
    Oct. 31, 1967    Japan..................................42/69585

[52] U.S. Cl. ....................................95/10 C, 95/42, 95/53 E
[51] Int. Cl. ..........................................................G03b 7/08
[58] Field of Search......................95/10 C, 53, 42; 250/210

[56] References Cited

UNITED STATES PATENTS

| | | | |
|---|---|---|---|
| 3,533,348 | 10/1970 | Yanagi | 95/42 X |
| 3,303,766 | 2/1967 | Karikawa et al. | 95/10 C |
| 3,324,779 | 6/1967 | Nobusawa et al. | 95/42 |
| 3,349,678 | 10/1967 | Suzuici et al. | 95/10 C |
| 3,442,190 | 5/1969 | Erickson | 95/10 C |

Primary Examiner—Joseph F. Peters
Attorney—Harry G. Shapiro

[57] ABSTRACT

A camera of the retractable mirror-type having an electronic shutter has related to the shutter a circuit for measuring light intensity of a scene to be photographed passing through the camera's lens and a circuit for memorizing the measured value of light intensity by converting such value to an electrical quantity. A switch is provided intermediate the measuring and memory circuits, and means is provided to open the switch before the actuation of the retracted mirror may affect the light intensity falling on a light-sensitive element in the measuring circuit to thereby shorten the delay time before the shutter is actuated.

2 Claims, 4 Drawing Figures

*INVENTOR.*
SHIGEO ONO
BY
*Harry S. Shapiro*
ATTORNEY

EXPOSURE-MEASURING DEVICE FOR CAMERAS PROVIDED WITH ELECTRONIC SHUTTER

This invention relates to an exposure-measuring device for a camera having an electronic shutter.

In a camera having an electronic shutter, particularly of the single-lens reflex-type, which is controlled by the intensity of light passing through the camera lens, a photosensitive element is provided on the rear surface of the penta prism of the finder, or light is introduced into the photosensitive element provided at the lower portion of the camera body by means of a concave mirror provided behind the semitransparent movable reflecting mirror. In such cameras, there is interference with the light coming into the photosensitive element from the camera lens when the shutter is operated caused by retraction of the reflecting mirror out of the light's path. Thus, it has been found necessary to memorize the intensity of light before the shutter is operated.

My application, Ser. No. 695,200 filed Jan. 2, 1968 discloses means related to a shutter to memorize the intensity of light before operation or retraction of the reflecting mirror. When, as described in the application, the connection between the light measuring circuit and the memory circuit is disconnected, the brightness of the background may have changed, or a leaking of current present in the memory element condenser may have occurred. For the best results, the time delay from the time at which the intensity of light is memorized to the time at which the shutter is operated should be as short as possible.

The object of this invention is to provide a switch means for interrupting the connection between the light-measuring circuit and memory circuit before the actuation of the reflecting mirror affects the light intensity falling on the light-sensitive element to shorten as much as possible the delay time before the shutter is actuated.

The exposure measuring device of this invention provides a circuit for measuring the intensity of light of a scene having passed through the camera lens, and a memory circuit for memorizing the measured value after having converted the measured amount of light into an electrical value, which is the function of the intensity of the light, and controlling the time required for the conduction of an electromagnet to carry out the adjustment of the exposure time. A switch is provided for opening and closing the connecting line between the measuring circuit and memory circuit. Means is provided for driving an optical means which conveys light to the photosensitive element in the measuring circuit. Means is provided for interlocking the switch with the driving means, the driving means acting to close the switch at the normal stationary position and to open the switch just prior to the start of the operation of the driving means to retract the optical means out of the light path of the camera lens.

Figure 3:
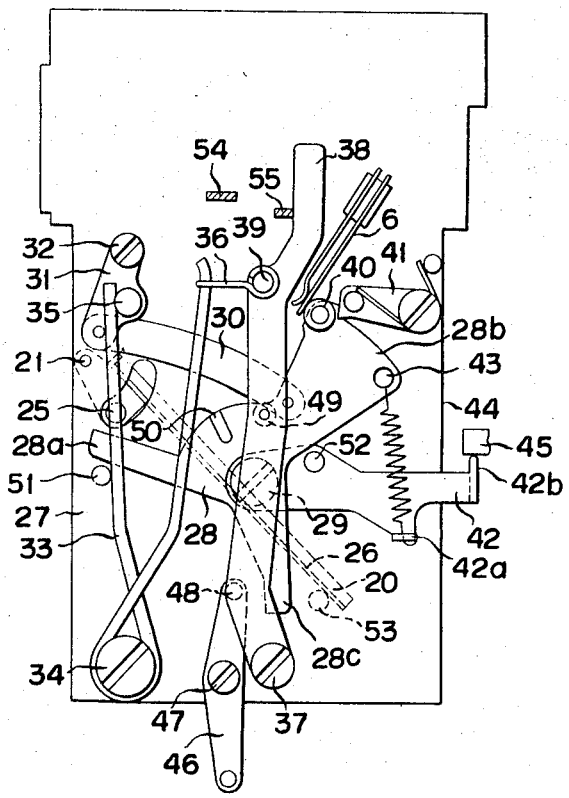
Figure 2:
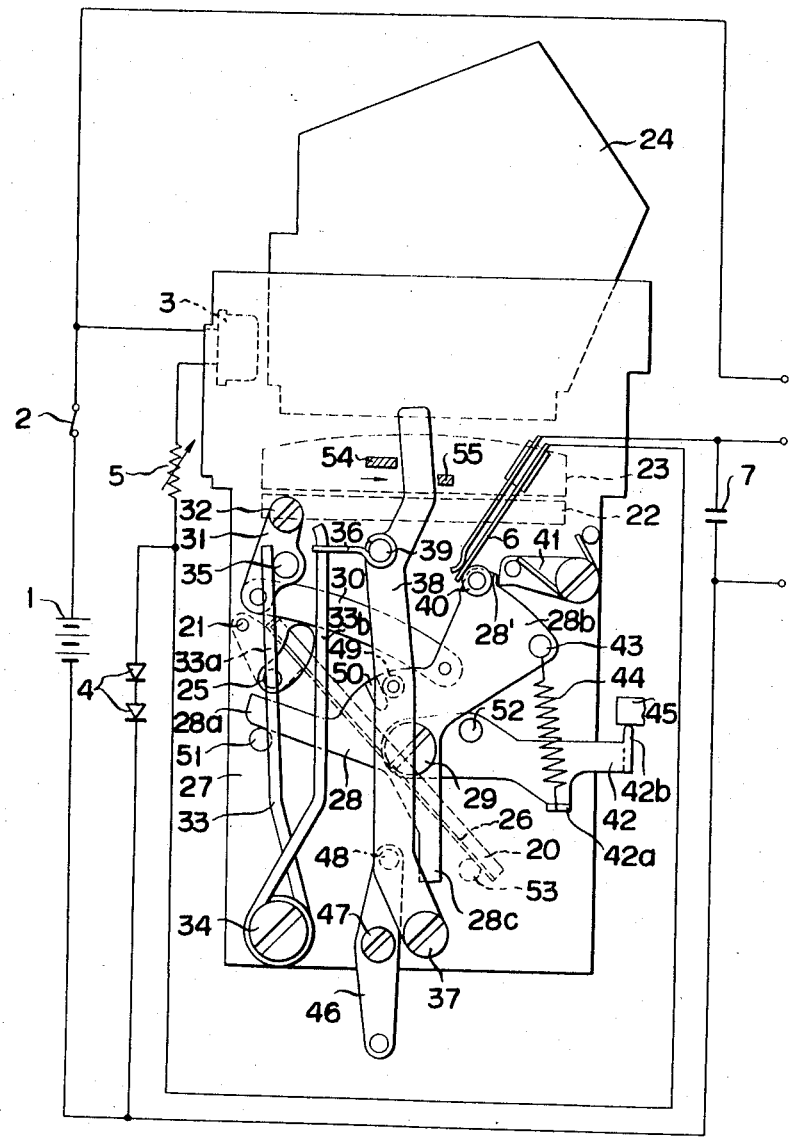
Figure 4:
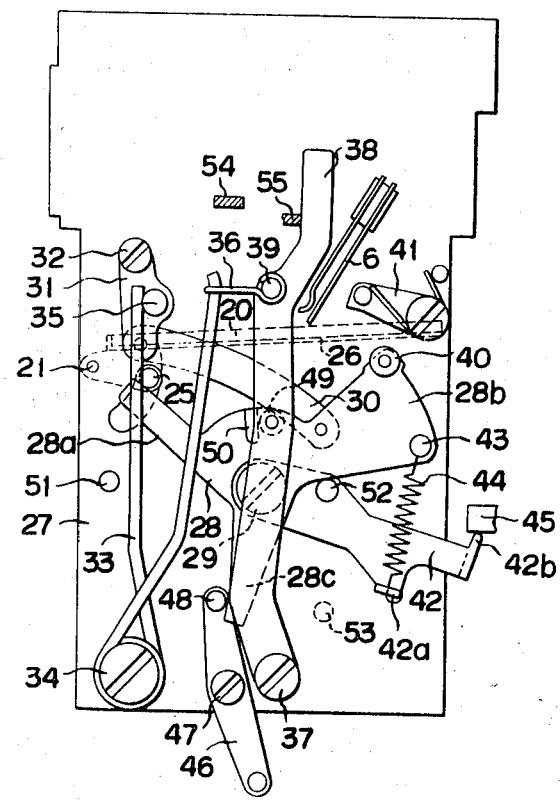

The present invention will be more apparent from the following description taken in conjunction with the drawings in which:

FIG. 1 shows a time-controlling circuit having a memory circuit suitable for an electronic shutter; and FIGS. 2, 3 and 4 are side views of an embodiment of the invention, FIG. 2 showing the state in which the shutter is released, FIG. 3 the state in which the shutter is wound up, and FIG. 4 the state in which the mirror is raised, and shutter is in operation.

Referring to FIG. 1, the circuit of which the memory means is explained in detail in the aforementioned application, comprises a source of electricity or battery 1, a switch 2, a photoconductor 3, a diode 4, a correction resistance 5, a switch 6, and a condenser 7. The photoconductor 3 has a resistivity which is the function of the intensity of light which passes through the camera lens. The resistivity of the photoconductor is changed in proportion to the intensity of light, and the voltage at the terminals of the diode 4 is in proportion to the logarithm of the current passing through the diode. Thus, in the circuit shown in FIG. 1, wherein the electric source 1, the photoconductor 3 and the diode 4 are connected in series, the intensity of light is logarithmically converted into terminal voltage.

When the switch 6 is closed, the condenser 7 is charged equally to the terminal voltage of the diode 4. When the switch 6 is opened, an unusually wide range of light intensity is memorized in the condenser 7. 8 is a field-effect-type transistor, and provides a source follower along with the potential divider 9. 10, 11, and 12 are NPN-type transistors, respectively, and the voltage charged in the condenser 7 is divided and directed to the base of the transistor 10.

The input resistance of the gate of the field-effect-type transistor 8 is almost indefinite, and therefore the power consumption at the gate is zero. Therefore, when the switch 6 is opened, the base voltage of the transistor 10 is maintained to be in proportion to the voltage of the condenser 7 in spite of the fact that there is consumption of electric power at the base. The potential divider 9 has the effect of correcting the properties such as illumination or resistance of the photoconductor 3.

The joint portion between the base and emitter of the transistor 10 may be considered as in a diode, and therefore, the voltage at the base is retained as voltage logarithmically converted from the intensity of light, and thereby antilogarithmically converted current runs through the collector circuit. Current in proportion to the intensity of light runs through the collector circuit, and the transistor 11 acts as a differential amplifier along with the transistor 10 and stabilizes the operation. At the same time, the collector current of the transistor 10 is controlled by the variable resistor 13, which is interlocked to the means for determining the stop value and film sensitivity. The transistor 12 stabilizes the current running through the transistors 10 and 11, and at the same time increases the input resistance at the base of the transistor 10. As a result, control of the base voltage is more readily obtained. 14 is a switch which is opened in the interlocking relation to the opening operation of the shutter; 15 is a condenser; 16 and 17 are PNP-type transistors, respectively, and form a Schmidt trigger. 18 is an electromagnet for controlling the closing operation of the shutter.

When the switch 14 is opened in the interlocking relation to the opening operation of the shutter, the condenser 15 starts accumulation, with the current having passed through the same in proportion to the intensity of light. When the base voltage of the transistor 16 is lowered to a certain value, the transistor 17 is in the off state so that the current to the electromagnet 18 is cut to start the closing operation of shutter. 19 is a switch which is closed before the shutter starts to operate.

By providing means as hereinafter described with regard to FIGS. 2, 3 and 4 for opening and closing the switch 6 before retraction of the reflecting mirror, the time delay from the time at which the intensity of light is memorized to the time at which the shutter is operated is considerably shortened.

Referring to FIG. 2, which shows the state in which the shutter is released, 20 is a movable mirror which rotates about a shaft 21, the mirror being rotated in a clockwise direction by a spring (not shown). 22 is a focusing plate, 23 is a condenser lens, and 24 is a penta prism. The aforementioned photoconductor 3 is provided on the back of the penta prism 24. A part of the light passing through the camera lens is reflected by the mirror 20 and penta prism 24, and is led into the photoconductor 3. 25 is a jumping pin related to a supporting plate 26 for the mirror 20. The pin 25 is projected out of the wall from a hole in the mirror box 27. 28 is a jumping member rotatably mounted upon a shaft 29. The jumping member has arms 28a, 28b and 28c. The arm 28a is adjacent the pin 25. The jumping member 28 is connected to links 30 and 31, and the link 31 is mounted to rotate about a shaft 32. 33 is a bent spring for driving the mirror 20, and is hooked around a fixed shaft 34, with the end of one arm 33a in engagement with a pin 35 on the link 31, and the end of the other arm 33b connected to a pin 39 on a charge lever 38 through a lever 36. The charge lever 38 is mounted to rotate about a shaft 37. A pin covered with an electrically insulating jacket 40 is provided on the arm 28b of the jumping member 28, and is cooperable with the switch 6. The arm 28b is formed with a concave portion, which is connected to a start key 41. 42 is a diaphragm driving lever mounted to rotate about the shaft 29 which, as above described, also serves as the shaft upon which the jumping member 28 is mounted. A spring 44 extends between a projection 42a on the diaphragm jumping lever and a pin 43 on the arm 28b. A projection 42b on the diaphragm jumping lever engages a projection 45 on the diaphragm driving ring of the lens. 46 is a shutter release lever rotatably mounted on a shaft 47, the lever having a pin 48 at the end thereof cooperable with the third arm 28c of the jumping member 28.

Also as shown in FIG. 2, the jumping member 28 is provided with a projection 50 cooperable with a pin 49 extending from the charge lever 38. A stop 51 is provided for the jumping member 28. A pin 52 extends from the diaphragm driving lever 42 for engagement by the edge of the jumping member 28. A fixed pin or stop 53 is provided for engagement by the mirror 20. Spaced levers 54 and 55 are shown in cross section, the lever 54 being interlocked with the shutter, and the lever 55 acting to hold the charge lever 38.

The following is an explanation of the operation of the device.

Starting with the device in the state in which the shutter is released as shown in FIG. 2, the driving spring 33 operates in a direction to decrease the interval between its two arms 33a and 33b, and therefore the driving spring tends to rotate the charge lever 38 in a counterclockwise direction. Due to the engagement of the spring arm 33a with the pin 35, the link 31 is urged to the right. The counterclockwise rotation of the charge lever 38 is transmitted to the jumping member 28, the pin 49 on the charge lever applying pressure to the projection 50 on the jumping member. However, since the force imparted to the link 30, which is intermediate the jumping member 28 and the link 31, is superior or greater than the force imparted to the pin 35 on the link 31, clockwise rotation is imparted to the jumping member. The engagement of the arm 28a with the stationary pin or stop 51 prevents the jumping member 28 from rotating in a counterclockwise direction beyond the position shown in FIG. 2. In this stationary position, the jumping member arm 28a is confined between the stop 51 and the jumping pin 25 with a slight amount of clearance, and there is clearance between the jumping member arm 28b and the pin 52 on the diaphragm driving lever 42. The mirror 20 is held in engagement against the fixed pin or stop 53 by a spring (not shown). At this stage, the switch 6 is closed and presses against the insulating cylinder or jacket 40 on the jumping member arm 28b.

When the shutter is charged, the lever 54 interlocked to the shutter is moved in the direction as shown by the arrow in FIG. 2 causing clockwise rotation of the charge lever 38 to the position shown in FIG. 3 where it is held or locked by the lever 55. The rotation of the charge lever energizes the driving spring 33. The clockwise rotation of the charge lever would impart clockwise rotation to the jumping member 28; however, since the projection 28' on the arm 28b is in the path of the key 41, the actual rotation of the jumping member is prevented. The switch 6 remains closed since the switch 6 is still engaged by the insulating cylinder 40, as shown in FIG. 3. Thus, the switch 6 retains its closed state, before and after of the winding up of the shutter. As a result, the condenser 7 is charged through the photoconductor 3 as the brightness of the scene is changed, or the condenser discharges through the diode 4 to always keep the same voltage as the terminal voltage of the diode 4.

When, as shown in FIG. 4, the shutter is released by rotating the key 41 in the clockwise direction, the jumping member 28, through the links 31 and 30, starts rotation in a clockwise direction caused by the energized spring 33. The switch 6 is opened directly, and the voltage of the condenser 7 is memorized as the function of the intensity of light. At this point in time, the jumping member drive 28a and 28b have not as yet contacted the pins 25 and 52 because of the play or clearance between the parts, or contact of the parts is made to start the operation of the diaphragm driving ring through the projection 45 on the ring. The movements of these engageable parts do not substantially affect the intensity of light on the photoconductor 3. In addition, when the jumping member 28 is rotated in the clockwise direction, and the jumping mirror 20 is retracted out of the light path of the camera lens, the diaphragm driving lever 42, also being rotated in clockwise direction, results in the projection 45 of the diaphragm driving ring being lowered along with the rotation of the diaphragm driving lever 42 to stop down the aperture of the camera lens. Finally, the jumping member arm 28c rotates the shutter release lever 46 to release the shutter.

The shutter speed is controlled to release the connection of the lever 55 at the termination of the closing operation, resulting in the charge lever 38 being rotated in counterclockwise direction. The pin 49 on the charge lever pushes the projection 50 on the jumping member so that the jumping member also is rotated in counterclockwise direction to the state of the mechanism as shown in FIG. 2.

In the device as above described, the memory circuit need not be of the condenser charging type. A memory means in which a servomechanism is used may be employed.

Regarding the structure of the switch 6, a three-contacts-type or a switch of an interlocking-type having more than three contacts may be used depending on the kind of the structure of the memory means.

The application of this invention is not restricted to a single-lens reflex camera. The invention is applicable to a range finder camera in which the photosensitive element is fixed on the body, and the light having passed through the camera lens is led into the photosensitive element by means of an optical device such as a mirror, and wherein the optical device is retracted when photography is being carried out.

It will be apparent that with the structure of the invention, it is possible to considerably shorten the time delay from the time when the intensity of light is memorized to the time when the shutter is operated. Also, it is possible to obtain proper exposure against the intensity of light right before photography is carried out. Moreover, the effect caused by any leaking of current of the condenser 7 is small, and memory can be correctly carried out. The opening and closing of the switch 6 is carried out by a member indispensable to the mirror-operating mechanism of a single-reflex camera, and therefore the structure is quite simple. When photography is carried out continuously, while pushing the button with the device driven by an electric motor, the operation of measurement-memory control is correctly repeated.

I claim:

1. An exposure control device for a camera having an electronic shutter of which the exposure time is controlled in accordance with the light intensity of the object to be photographed, comprising a measuring circuit including a photosensitive element arranged to receive the light passing through a camera lens by means of an optical device retractably located in a measuring position, a memory circuit including a capacitor for memorizing the output of the measuring circuit, a switch for connecting and disconnecting the measuring circuit with said memory circuit, drive means for retracting the optical device out of the light path, the drive means closing the switch in the measuring position and opening the switch prior to movement of said optical device from the measuring position before the drive means commences to retract said optical device out of the light path, and means for controlling the exposure time in response to the memory circuit.

2. An exposure control device for a camera having an electronic shutter of which the exposure time is controlled in accordance with the light intensity of the object to be photographed, comprising a measuring circuit including a direct current source, a diode and a photoconductive cell connected in series, the photoconductive cell being arranged to receive light passing through a camera lens by means of an optical device retractably located in the measuring position, a condenser for memorizing the voltage across said diode, a switch for connecting and disconnecting the diode and the condenser, drive means for retracting said optical device out of the light path, the drive means closing the switch in the measuring position and opening the switch prior to movement of said optical device from the measuring position before the drive means commences to retract the optical device out of the light path, and means for controlling the exposure time in response to the voltage across the condenser.

* * * * *